July 29, 1952   E. E. HEWITT   2,604,900
PROTECTION MEANS FOR FLUID PRESSURE SYSTEMS
Filed March 20, 1947

INVENTOR
Ellis E. Hewitt
BY
Frank E. Miller
his ATTORNEY

Patented July 29, 1952

2,604,900

UNITED STATES PATENT OFFICE 2,604,900

PROTECTION MEANS FOR FLUID PRESSURE SYSTEMS

Ellis E. Hewitt, Edgewood, Pa., assignor to Westinghouse Air Brake Company, a corporation of Pennsylvania Application March 20, 1947, Serial No. 736,001

2 Claims. (Cl. 137—110)

This invention relates to fluid pressure control systems of the type embodying a fluid pressure controlled device, a fluid pressure control device and means for conveying control fluid pressure between said control device and said controlled device.

As an example, the throttle of a prime mover may be controlled by a fluid motor, the pressure of fluid in which is arranged to be controlled by an operator's control device through the medium of a connecting pipe, which, due to vibration, may become broken. It is undesirable that the control of the throttle of the prime mover be interrupted due to a broken pipe, and the principal object of the invention is therefore the provision of a fluid pressure control system for ensuring the control of the device being controlled in case of breakage of a fluid pressure control pipe thereto.

This object is attained by the provision of two control pipes between the control device and the device to be controlled and of improved means associated with said devices which is effective in case of breakage of either pipe to maintain, through the other pipe, control of the device being controlled.

According to a further feature of the invention improved means is provided for indicating to or warning the operator of breakage of a control pipe and of the location of such break.

Another object of the invention is the provision of improved protection means for preventing unnecessary loss of fluid under pressure from a control system in case of a broken pipe in said system.

Other objects and advantages of the system will become apparent from the following more detailed description thereof.

Figure 1:
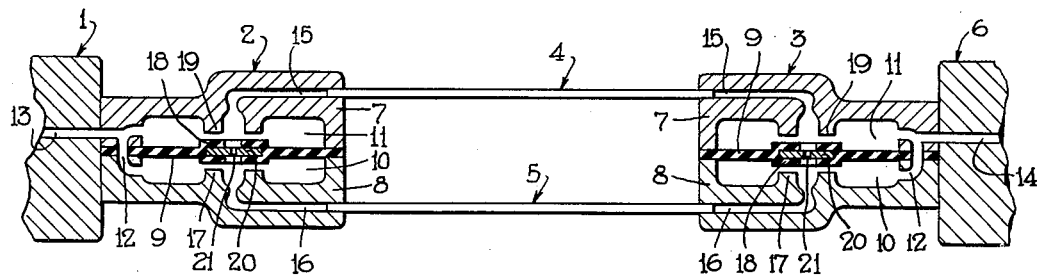
Figure 2:
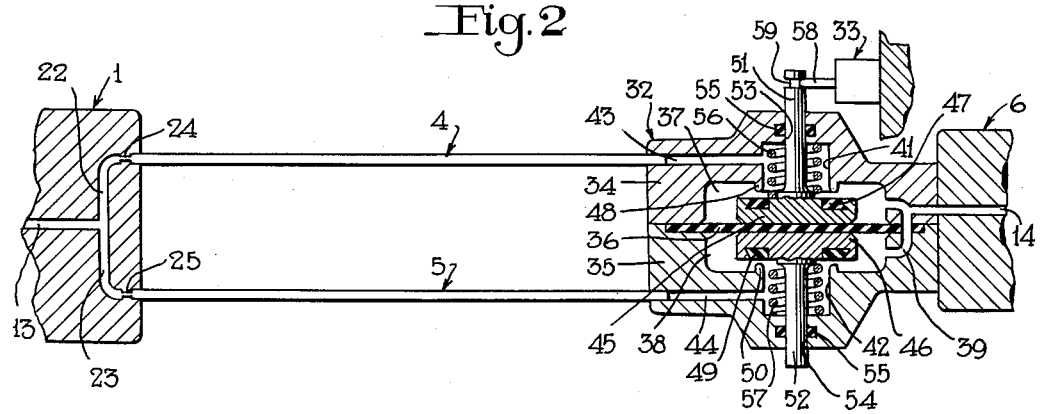

In the accompanying drawing; Fig. 1 is a diagrammatic sectional view of a control system embodying one form of the invention; and Fig. 2 is a similar view of a modified form of the invention.

Description of Fig. 1

The fluid pressure control system shown in Fig. 1 of the drawing comprises valve devices 1, 6, one of which may serve as a device to be actuated or controlled while the other may serve as a control device, pressure of control fluid being transmitted through the medium of either one or both of two pipes 4 and 5 and protection valve devices 2 and 3 associated, respectively, with said devices providing control connections with said pipes.

Each of the protection valve devices 2 and 3 may comprise a casing having two sections 7 and 8 secured together. The casing of the protection valve device 2 is mounted on the casing of the control valve device 1, while the corresponding casing of the protection valve device 3 is mounted on the casing of the device 6 to be actuated or controlled. Clamped between the two casing sections 7 and 8 in each of the protection valve devices 2 and 3 is a flexible diaphragm valve 9 which divides the interior of the casing into chambers 10 and 11. Chambers 10 and 11 are in constant open communication with each other by way of a passage 12 having a branch which, in the protection valve device 2, is in constant open communication with a control passage 13 in the control valve device 1. Similarly, chambers 10 and 11 in the corresponding protection valve device 3 are in constant open comunication through the branch of passage 12 with a control passage 14 in the device 6 to be actuated or controlled. The control passages 13 and 14 are for the purpose of permitting the flow of control fluid under pressure between the control valve device 1 and the device 6 to be actuated and controlled, or vice versa.

Chamber 11 in the protection valve device 2 is in normal open communication with the corresponding chamber 11 in the protection valve device 3 by way of a passage 15 in the casing section 7 of each of the two protection valve devices and the pipe 4 which is connected to both of said passages. Similarly, the chamber 10 in the protection valve device 2 is in normal open communication with the corresponding chamber 10 in the protection valve device 3 by way of the pipe 5 and a passage 16 in the casing section 8 of each of the two protection valve devices 2 and 3.

An annular rib 17 in the casing section 8 of each of the protection valve devices encircles the end of the passage 16 which is in normal open communication with the chamber 10. The annular rib 17 forms a seat for sealing engagement with a valve portion 18 of the diaphragm valve 9 to close communication between the chamber 10 and the passage 16. Similarly, an annular rib 19 in casing section 7 of each of the protection valve devices is provided for sealing engagement with the valve portion 18 to close chamber 11 from control pipe 4 by way of the passage 15. Stress in the diaphragm 9 normally supports the valve portion 18 substantially midway between and out of contact with ribs 17 and 19, as shown in the drawing.

The valve portion 18 of the diaphragm valve 9 constitutes a thickened central portion of the diaphragm in which there is embedded a member 20 which may be made of hard material. Member 20 is provided with a through axial opening 21 of small flow area.

Assume that it is desired to communicate fluid under pressure between the valve device 1 and the device 6, the fluid under pressure flows through the control device passage 13 or 14, the passage 12, the chambers 10 and 11, past the diaphragm valve 9 and through the passages 15 and 16, in the protection valve device 2 or 3, to the control pipes 4 and 5 leading to the corresponding protection valve device 2 or 3, wherein it flows through passages 15 and 16, chambers 10 and 11, and passage 12 to corresponding passage 13, 14 in the other device 1 or 6 to be actuated or controlled. It will be noted that in both protection devices 2 and 3 the pressure of fluid is equal on both sides of the diaphragm 9. To release fluid under pressure from passage 13 or 14 in either of the devices 1 or 6, fluid under pressure will be released from the corresponding passage 13 or 14 in the other device 1 or 6 whereupon fluid under pressure will be released from the former passage by way of both pipes 4 and 5 as will be evident from the above description.

Now assume that with the pipes 4 and 5 charged with fluid under pressure as above described, one of said pipes breaks. A sudden reduction in the pressure of fluid in the broken control pipe 4 or 5 will then occur, and as a result, the pressures of fluid acting in chambers 10 and 11 on opposite sides of the diaphragm valve 9 in both protection devices 2 and 3 will be suddenly unbalanced. The diaphragm valve 9 in each protection device 2 and 3 will therefore be displaced in the direction of the reduced pressure, which is toward the chamber 10 or 11, whichever one of said chambers is open to the broken control pipe 4 or 5.

In each protection device 2 and 3 the diaphragm valve 9 will be thus displaced until the valve portion 18 seats on the annular rib 17 or 19 thus closing direct control communication from the chamber 10 or 11 to the break in the control pipe 4 or 5 by way of the passage 15 or 16, respectively. Flow of fluid under pressure to the break in the broken control pipe 4 or 5 will then be restricted to the relatively small flow capacity of opening 21 and this flow to or the resulting flow at the pipe break will provide an audible indication of the broken pipe and the location of said break, i. e., whether it is at the device 1 or at the device 6.

When either pipe 4 or 5 is broken and the diaphragm valve 9 in the two protection devices 2 or 3 moves into sealing contact with the respective seat 17 or 19, it will be noted that the area of said diaphragm valve within said seat will be subjected to substantially atmospheric pressure through the pipe break while the corresponding area at the opposite side of the diaphragm valve will be subjected to pressure of fluid in the unbroken control pipe, and the differential between these opposing forces on the diaphragm valve will hold said diaphragm valve seated against the seat 17 or 19 to prevent undesired loss of the control fluid pressure from the unbroken pipe 4 or 5, thereby maintaining control through the unbroken pipe between the device 6 and the device 1. It will be apparent that the protection devices 2 and 3 will operate as above described in case either of the control pipes 4 or 5 breaks to prevent undesired loss of fluid under pressure from the unbroken pipe so as to maintain through the unbroken pipe control communication between the device 6 and the device 1, while the leak of fluid under pressure through the opening or openings 21 to the pipe break will give the audible indication of the broken pipe condition and its location. It will be appreciated that only one of the openings 21 is sufficient to effect audible indication of a broken pipe 4 or 5.

When either pipe 4 or 5 is broken and fluid under pressure is released from the unbroken pipe, the stress in diaphragm valves 9 in the protection devices 2 and 3 will return them to the position in which they are shown in the drawing, but upon subsequent supply of fluid under pressure to the unbroken pipe said diaphragms will promptly seat to isolate the broken pipe.

When the broken pipe is replaced, the diaphragm valves 9 will return to the position in which they are shown in the drawing upon substantial equalization of the pressure of fluid in pipes 4 and 5 to provide control of the device 6 through both pipes, as above described.

*Description of Fig. 2*

Now referring to Fig. 2, this modified structure comprises a device 1, the control pipes 4 and 5, a protection valve device 32, similar to the protection valve device 3 in Fig. 1, a signal device 33 and the device 6.

The passage 13 in the valve device 1 divides into two branch passages 22 and 23 connected respectively to pipes 4 and 5. Chokes 24 and 25 are inserted in the outer ends of the passages 22 and 23 respectively, which chokes replace the protection valve device 2 in Fig. 1, as will hereinafter be described.

The protection valve device 32 comprises a casing made up of two sections 34 and 35 between which is clamped a resilient diaphragm 36 which divides the interior of said casing into chambers 37 and 38. Chambers 37 and 38 are in constant open communication with each other by way of a passage 39 which has a branch which registers with the passage 14 in the device 6 to be controlled.

The casing sections 34 and 35 are provided with bores 41 and 42 arranged at right angles to the normal plane of diaphragm 36 and which open inwardly into the chambers 37 and 38, respectively. A passage 43 is provided in the casing section 34 opening from the bore 41 and connecting with the control pipe 4. A similar passage 44 is provided in the casing section 35 which connects the bore 42 with the control pipe 5. Two valve members 45 and 46 are centrally disposed in the chambers 37 and 38 respectively and secured to the diaphragm 36 on opposite sides thereof. A resilient annular valve ring 47 is mounted in a groove in the member 45 and disposed opposite to the open end of bore 41 to cooperate with an annular valve seat rib 48 which is formed in the casing section 34 around said bore. A similar valve ring 49 is provided in the opposite member 46 for cooperation with a similar rib 50 formed in the casing section 35 and encircling the bore 42. Rods 51 and 52 are integrally secured to the valve members 45 and 46 respectively and project centrally therefrom through the bores 41 and 42 and accommodating smaller bores 53 and 54 which extend therefrom through the casing sections 34 and 35. Resilient sealing rings 55 are provided in grooves open to bores 53 and 54 for cooperation with the peripheral surfaces of rods 51 and 52. Springs 56 and 57, disposed in the bores 41 and 42, are interposed between the valve members 45 and 46 and the casing sections 34 and 35, respectively, for urging said valve members to a normal position in which both of the valve rings 47 and 49 thereof are disposed away from the seat ribs 48 and 50.

The signal device 33 may be of any desired type located wherever desired, and may be operated by the protection device 32 in any desired manner, but for illustrative purposes, comprises a rockable signal operating lever 58 which projects therefrom into an accommodating groove 59 formed in the projecting end of rod 51 for rocking movement by said rod upon movement thereof to effect a signal, as will be later described.

In normal operation of the system, when fluid under pressure is supplied to the passage 13 in the control device 1, for example, it will flow from the passage 13 through the branch passages 22 and 23 and chokes 24 and 25 into the control pipes 4 and 5 in substantially equal amounts, whence said fluid under pressure flows into the protection valve device 32 through the passages 43 and 44, into and through the chambers 37 and 38 on opposite sides of the diaphragm 36, into the opposite ends of the passage 39 and thence to passage 14 in the device 6, in this case the device to be actuated and controlled. It will be appreciated, however, that the system may become charged with fluid under pressure, by flow from passage 14 to passage 13 without in any manner affecting the operation of the protection apparatus subsequently to be described.

Normal control communication of pressure of fluid is thus established between the device 1 and the device 6 and the normal stress of the diaphragm 36 plus the opposing action of the springs 56 and 57 holds the diaphragm of the protection valve device 32 in a neutral position whereby the rod 51 and lever 53 of the signal device 33 is so positioned that the signal means controlled thereby indicates normal operation of the system.

Now assume that the control pipe 5 is broken, fluid under pressure then rushes rapidly from the protection valve device chamber 38 at the under side of the diaphragm 36 by way of the bore 42 and the relatively unrestricted protection valve passage 44 and into the broken pipe 5 to the atmosphere at the break. The sudden evacuation of fluid under pressure from the under side of the diaphragm 36 causes a preponderance of pressure acting on the upper side of said diaphragm which displaces it downwardly, seating the valve ring 49 attached thereto on the seat rib 50 and thereby closing communication between the broken control pipe 5 and the chamber 38 by way of the bore 42 and passage 44.

Normal control communication of pressure of fluid is maintained between the device 1 and the device 6, however, by way of the unbroken pipe 4 and the unseated valve ring 47. Again the pressures in the chambers 37 and 38 are substantially equalized by way of the constantly open communicating passage 39, but due to differences in areas exposed to said pressures on top and bottom of the diaphragm and attached valve members, a resultant force persists to keep the valve ring 49 seated against the rib 50.

While the above has been occuring, the rod 51 has been pulled downwardly with movement of the diaphragm actuated valve 46 into contact with seat rib 50 thereby actuating the switch 58 which rides in the rod grooves 59 to render the signal means operative to effect a signal at some station which may be remote from the broken pipe and thereby indicate the fact that one of the control pipes is broken.

It will be understood that the protection valve system responds to isolate the broken pipe and to maintain control communication of pressure of fluid through the unbroken pipe when either the pipe 5 or the pipe 4 is broken in a manner as above described and the switch device 33 actuated by movement of the arm 58 will effect a signal to notify of the break.

At the same time as the above occurs, fluid under pressure escapes to the pipe break by way of the respective choke 24 or 25, said fluid under pressure blowing to the atmosphere through the break in the pipe. Such escape of fluid under pressure serves to aid in locating the break by producing an audible sound, emanating therefrom.

Having now described my invention, what I claim as new and desire to secure by Letters Patent is:

1. A valve device comprising in combination, a divided casing having a fluid pressure chamber between portions thereof, one fluid pressure opening to said chamber, and a second fluid pressure opening to said chamber in alignment with said one fluid pressure opening, a third fluid pressure opening, a first valve seat encircling said one opening, a second valve seat encircling said second fluid pressure opening, a resilient diaphragm disposed in said chamber intermediate said one fluid pressure opening and said second fluid pressure opening and clamped at its outer peripheral edge between said portions, a double valve formed integrally with said diaphragm and disposed in alignment with said first valve seat and with said second valve seat equidistant therefrom, said valve being provided with a central opening extending axially therethrough, and an orifice element embedded in said double valve restricting said central opening.

2. In combination, two devices each comprising a divided casing having a fluid pressure chamber formed between portions of said casing, a first fluid pressure opening to said chamber, a second fluid pressure opening to said chamber opposite to and in alignment with said first opening, a third opening to said chamber, a first valve seat encircling said first opening, a second valve seat encircling said second opening, a resilient diaphragm clamped at its outer peripheral edge between said portions and disposed in said chamber intermediate said first and said second opening, and a double valve element formed integrally with said diaphragm and disposed in alignment with both said first and said second valve seat; a first fluid pressure conduit connecting the respective first fluid pressure opening of each of said devices one with the other; and a second fluid pressure conduit connecting the respective second fluid pressure opening in each of said devices one with the other.

ELLIS E. HEWITT.

REFERENCES CITED

The following references are of record in the file of this patent:

UNITED STATES PATENTS

| Number | Name | Date |
|---|---|---|
| 780,414 | Duncan | Jan. 17, 1905 |
| 821,859 | Clegg | May 29, 1906 |
| 922,578 | Gries | May 25, 1909 |
| 992,139 | Poche | May 9, 1911 |
| 1,154,962 | Bayles | Sept. 28, 1915 |
| 1,309,362 | Lehmann | July 8, 1919 |
| 1,781,366 | Campula | Nov. 11, 1930 |
| 1,870,484 | Basta | Aug. 9, 1932 |
| 2,041,726 | Pray | May 26, 1936 |
| 2,117,389 | Yoder | May 17, 1938 |
| 2,219,408 | Benz | Oct. 29, 1940 |
| 2,322,658 | Overbeke | May 9, 1941 |

FOREIGN PATENTS

| Number | Country | Date |
|---|---|---|
| 482,935 | Great Britain | of 1938 |
| 543,894 | Great Britain | of 1942 |